(12) United States Patent
Zhang (10) Patent No.: US 9,965,066 B2
(45) Date of Patent: May 8, 2018

(54) PHYSICAL FEEDBACK SYSTEM, CONTROL METHOD AND ELECTRONIC DEVICE

(71) Applicant: Xiaomi Inc., Beijing (CN)

(72) Inventor: Xu Zhang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 271 days.

(21) Appl. No.: 14/840,040

(22) Filed: Aug. 30, 2015

(65) Prior Publication Data
US 2016/0011684 A1 Jan. 14, 2016

Related U.S. Application Data (63) Continuation-in-part of application No. PCT/CN2013/090932, filed on Dec. 30, 2013.

(30) Foreign Application Priority Data

Mar. 4, 2013 (CN) .......................... 2013 1 0068307

(51) Int. Cl.
*G06F 3/041* (2006.01)
*G06F 3/02* (2006.01)
(Continued)

(52) U.S. Cl.
CPC .............. *G06F 3/041* (2013.01); *G06F 3/016* (2013.01); *G06F 3/0202* (2013.01);
(Continued)

(58) Field of Classification Search
CPC ........ G06F 3/041; G06F 3/016; G06F 3/0482; G06F 3/0488; G06F 3/0202; G06F 2203/04102

See application file for complete search history.

(56) References Cited

U.S. PATENT DOCUMENTS 9,182,820 B1 * 11/2015 Hebenstreit .......... G09B 21/003
2007/0152974 A1 * 7/2007 Kim ........................ G06F 3/016
345/168

(Continued)

FOREIGN PATENT DOCUMENTS

CN 102339166 A 2/2012
CN 103207672 A 7/2013
(Continued)

OTHER PUBLICATIONS

Extended European Search Report for EP Application No. 13876857.7 dated Sep. 16, 2016.
(Continued)

*Primary Examiner* — Claire X Pappas
*Assistant Examiner* — Gerald Oliver
(74) *Attorney, Agent, or Firm* — Jun He Law Offices P.C.; James J. Zhu (57) ABSTRACT

A physical feedback system provided by the present disclosure includes: at least one physical feedback unit below a flexible touch screen; wherein the physical feedback unit includes an armature part and a coil part, at least one of the armature part and the coil part is in an active state, and a relative distance between the armature part and the coil part is initially a predetermined value; when the coil part is energized with a current, the relative distance between the armature part and the coil part is changed due to electromagnetism, and the changed relative distance is greater than or smaller than the predetermined value, so that a protrusion or a depression is formed at a corresponding position of the flexible touch screen.

19 Claims, 8 Drawing Sheets

(51) Int. Cl.
*G06F 3/01* (2006.01)
*G06F 3/0482* (2013.01)
*G06F 3/0488* (2013.01)

(52) U.S. Cl.
CPC .......... *G06F 3/0482* (2013.01); *G06F 3/0488* (2013.01); *G06F 2203/04102* (2013.01)

(56) References Cited

U.S. PATENT DOCUMENTS

| | | | |
|---|---|---|---|
| 2009/0250267 A1 | 10/2009 | Heubel et al. | |
| 2010/0162109 A1 | 6/2010 | Chatterjee | |
| 2010/0281440 A1* | 11/2010 | Underkoffler | G06F 3/017 715/863 |
| 2011/0304550 A1 | 12/2011 | Romera Jolliff et al. | |
| 2012/0105333 A1 | 5/2012 | Maschmeyer et al. | |
| 2014/0176462 A1* | 6/2014 | Ponziani | G06F 3/046 345/173 |

FOREIGN PATENT DOCUMENTS

| | | |
|---|---|---|
| JP | 1996095697 A | 4/1996 |
| JP | 2001177887 A | 6/2001 |
| JP | 2009123245 A | 6/2009 |
| JP | 2010176299 A | 8/2010 |
| JP | 2011519082 A | 6/2011 |
| JP | 2012194635 A | 10/2012 |
| JP | 2013528303 A | 7/2013 |
| KR | 20080093816 A | 10/2008 |
| RU | 2280923 C2 | 7/2006 |
| RU | 2011147013 A | 5/2013 |
| WO | 2011156024 A1 | 12/2011 |
| WO | 2012169138 A1 | 12/2012 |

OTHER PUBLICATIONS

First Office Action for MX Application No. MX/a/2015/007254 dated Apr. 20, 2016.
First Office Action for RU Application No. 2015124340 dated Dec. 22, 2016.

* cited by examiner

PHYSICAL FEEDBACK SYSTEM, CONTROL METHOD AND ELECTRONIC DEVICE

CROSS-REFERENCE TO RELATED APPLICATIONS

This application is a Continuation-In-Part of International Application No. PCT/CN2013/090932, filed Dec. 30, 2013, which is based upon and claims priority to Chinese Patent Application No. 201310068307.0, filed Mar. 4, 2013, the entire contents of which are incorporated herein by reference.

TECHNICAL FIELD

The present disclosure relates to a field of display screens, and more particularly, to a physical feedback system suitable for a flexible touch screen, a control method in an electronic device and the electronic device itself.

BACKGROUND

A touch screen is an external part that is most frequently used by a mobile terminal such as a mobile phone, a tablet, and an e-book reader. The touch screen not only can display information to a user, but also can permit the user to input information via touch.

Figure 1:
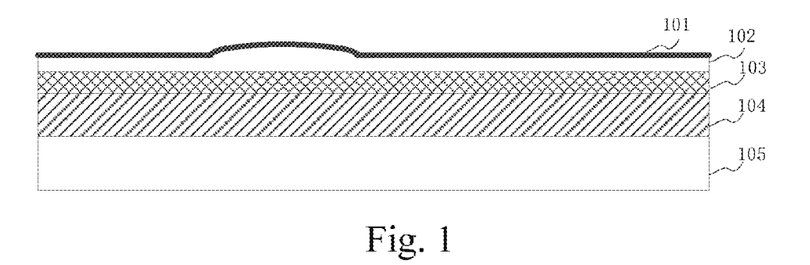
FIG. 1 is a structural schematic diagram of a touch display device including a physical feedback system.

Because the touch screen is usually a rigid screen, the user, while using the touch input function of the touch screen, can only perform such operations similar to taping, swiping, dragging and multi-finger touching on the flat and rigid outer surface of the touch screen, which lacks a due physical feedback. However, with the development of the touch screen technology, a flexible touch screen has been gradually put forward in recent years, thus emerging a touch display device including a physical feedback system. Referring to FIG. 1, which illustrates a structural schematic diagram of a touch display device including a physical feedback system, the touch display device includes a plastic flexible layer 101, an electrified liquid medium 102, a plastic hard layer 103, a LCD (Liquid Crystal Display) panel 104 and an internal component 105 for supporting the display of the LCD, which are sequentially placed from the outside in within a housing. Herein, both the plastic flexible layer 101 functioning as a touch layer and the plastic hard layer 103 functioning as a display layer are provided with a conducting loop and a node, which is similar to two poles of a capacitor. When a certain region of the screen is charged, the electrified liquid medium 102 will be attracted and aggregated, thus being capable of causing the volumetric expansion of the interior of the screen region, so that a protrusion 106 is formed at the corresponding position of the plastic flexible layer 101. The user can feel a sense of touch similar to performing a touch operation on a physical button while performing a touch operation on the protrusion 106. Moreover, when the protrusion 106 is pressed, the voltage of the structure similar to a capacitor formed by the plastic flexible layer 101 and the plastic hard layer 103 will be changed, thus being capable of obtaining an on-off control signal and feeding the signal back to the system.

SUMMARY

Embodiments of the present disclosure provide a physical feedback system suitable for a flexible touch screen, a control method in an electronic device and the electronic device thereof. The technical solutions are as follows.

According to a first aspect of the present disclosure, there is provided a physical feedback system, including: at least one physical feedback unit below a flexible touch screen; wherein the physical feedback unit comprises an armature part and a coil part, at least one of the armature part and the coil part is in an active state, and a relative distance between the armature part and the coil part is initially a predetermined value; and when the coil part is energized with a current, the relative distance between the armature part and the coil part is changed due to electromagnetism, and the changed relative distance is greater than or less than a predetermined value, so that a protrusion or a depression is formed at a corresponding position of the flexible touch screen.

According to a second aspect of the present disclosure, there is provided a method for controlling a physical feedback system in an electronic device comprising a flexible display screen and the physical feedback system according to the first aspect, the method comprising: detecting whether a display graph on the flexible touch screen is the same as a predetermined graph, the predetermined graph comprising any one or a combination of a button, a frame, a tag, a menu, a hyperlink and an icon; and if it is detected that the display graph is the same as the predetermined graph, energizing a physical feedback unit below the display graph with a current, so that a relative distance between the armature part and the coil part in the physical feedback unit is changed due to electromagnetism.

According to a third aspect of the present disclosure, there is provided an electronic device for controlling a physical feedback system according to the first aspect, comprising: a processor; a flexible display screen; and a memory for storing instructions executable by the processor, wherein the processor is configured to: detect whether a display graph on the flexible touch screen is the same as a predetermined graph, the predetermined graph comprising any one or a combination of a button, a frame, a tag, a menu, a hyperlink and an icon; and if it is detected that the display graph is the same as the predetermined graph, energize a physical feedback unit below the display graph with a current, so that a relative distance between the armature part and the coil part in the physical feedback unit is changed due to electromagnetism.

The technical solutions provided by the embodiments of the present disclosure may, in part, include the following advantageous effects: the present disclosure implements the physical feedback of the flexible touch screen through the physical feedback unit including the armature part and the coil part, solves the problem of long response time for implementing the physical feedback system by using an electrified liquid medium, and achieves the effect of enabling the flexible touch screen to be physically deformed quickly so as to greatly shorten the response time by energizing the coil part only.

It is to be understood that both the foregoing general description and the following detailed description are exemplary and explanatory only and are not restrictive of the invention.

BRIEF DESCRIPTION OF THE DRAWINGS

In order to explain the technical solutions in the embodiments of the invention more clearly, the drawings used in the descriptions of the embodiments will be simply introduced hereinafter. It is apparent that the drawings described hereinafter are merely some embodiments of the invention, and the person skilled in the art may also obtain other drawings according to these drawings without paying inventive labor.

DETAILED DESCRIPTION

To make the objects, technical solutions and advantages of the present disclosure more clear, the exemplary embodiments of the present disclosure will be further described in details with reference to the accompanying drawings.

First Embodiment

Figure 2A:
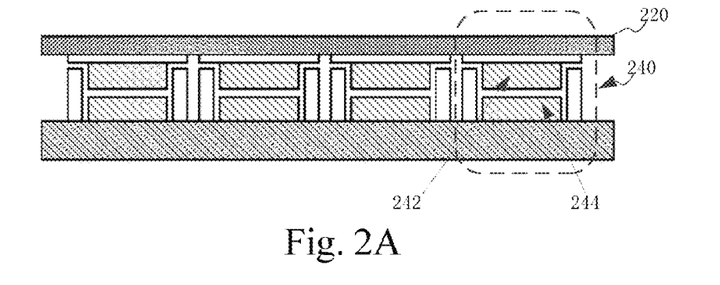
FIG. 2A is a structural schematic diagram of a physical feedback system provided by a first embodiment of the present disclosure.

Referring to FIG. 2A, which illustrates a structural schematic diagram of a physical feedback system provided by the first embodiment of the present disclosure, the physical feedback system may be implemented to become a part of an electronic device including a flexible touch screen. The electronic device may be any one of a smartphone, a tablet, an e-book reader, a laptop computer or a desktop display.

The physical feedback system includes: at least one physical feedback unit 240 below a flexible touch screen 220.

The physical feedback unit 240 includes an armature part 242 and a coil part 244, at least one of the armature part 242 and the coil part 244 is in an active state, and a relative distance between the armature part 242 and the coil part 244 is initially a predetermined value.

When the coil part 244 is energized with a current, the relative distance between the armature part 242 and the coil part 244 is changed due to electromagnetism, and the changed relative distance is greater than or less than a predetermined value, so that a protrusion or a depression is formed at the corresponding position of the flexible touch screen 240.

Figure 2B:
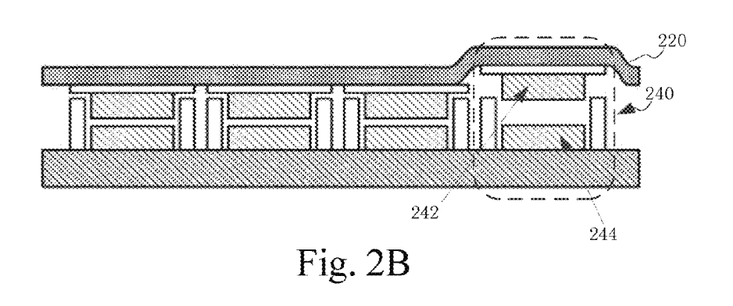
FIG. 2B is a structural schematic diagram of the physical feedback system provided by the first embodiment of the present disclosure while forming a protrusion.
Figure 2C:
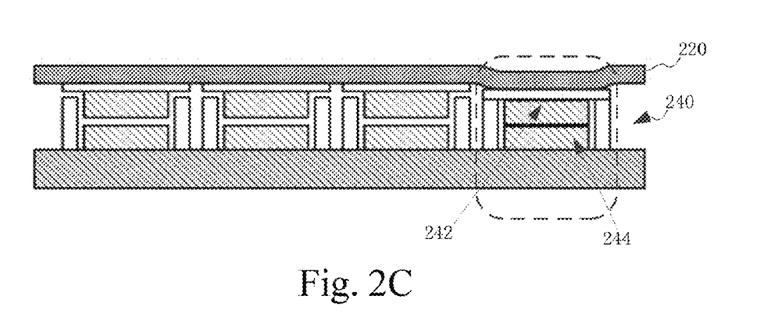
FIG. 2C is a structural schematic diagram of the physical feedback system provided by the first embodiment of the present disclosure while forming a depression.

The schematic diagram of forming a protrusion on the corresponding position of the flexible touch screen 240 may be as shown in FIG. 2B, and the schematic diagram of forming a depression on the corresponding position of the flexible touch screen 240 may be as shown in FIG. 2C.

In conclusion, the physical feedback system provided by the embodiment implements the physical feedback of the flexible touch screen through the physical feedback unit including the armature part and the coil part, solves the problem of long response time for implementing the physical feedback system by using an electrified liquid medium, and achieves the effect of enabling the flexible touch screen to be physically deformed quickly so as to greatly shorten the response time by energizing the coil part only.

Second Embodiment

Figure 3A:
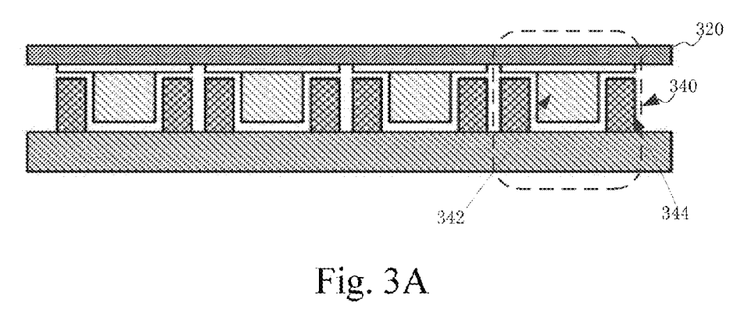
FIG. 3A is a structural schematic diagram of a physical feedback system provided by a second embodiment of the present disclosure.

Referring to FIG. 3A, which illustrates a structural schematic diagram of a physical feedback system provided by the second embodiment of the present disclosure, the physical feedback system may be implemented to become a part of an electronic device including a flexible touch screen. The electronic device may be any one of a smartphone, a tablet, an e-book reader, a laptop computer or a desktop display. The physical feedback system includes: at least one physical feedback unit 340 below a flexible touch screen 320.

The flexible touch screen 320 may be a rectangular flexible touch screen. If the flexible touch screen 320 may possibly display various graphs, the physical feedback unit 340 may be disposed below the entire region of the flexible touch screen 320. For instance, the electronic device is a computer, then the flexible touch screen 320 may possibly display various interfaces, and the positions of such graphs as buttons, menus and hyperlinks on each interface are not fixed; in this case, the physical feedback unit 340 may be disposed below the entire region of the flexible touch screen 320. However, if the flexible touch screen 320 only displays several fixed graphs, then the physical feedback unit 340 may be disposed below a partial region of the flexible touch screen 320 only. For instance, the electronic device is a touch queuing machine in a bank lobby, the flexible touch screen 320 may only display several fixed sets of interfaces, and the positions of such graphs as buttons, menus and hyperlinks on the several sets of interfaces are fixed; in this case, the physical feedback unit 340 may be only disposed below a partial region of the flexible touch screen 320 corresponding to "such graphs as buttons, menus and hyperlinks". In the embodiments, disposing the physical feedback unit 340 below the entire region of the flexible touch screen 320 is exemplified only.

Figure 3B:
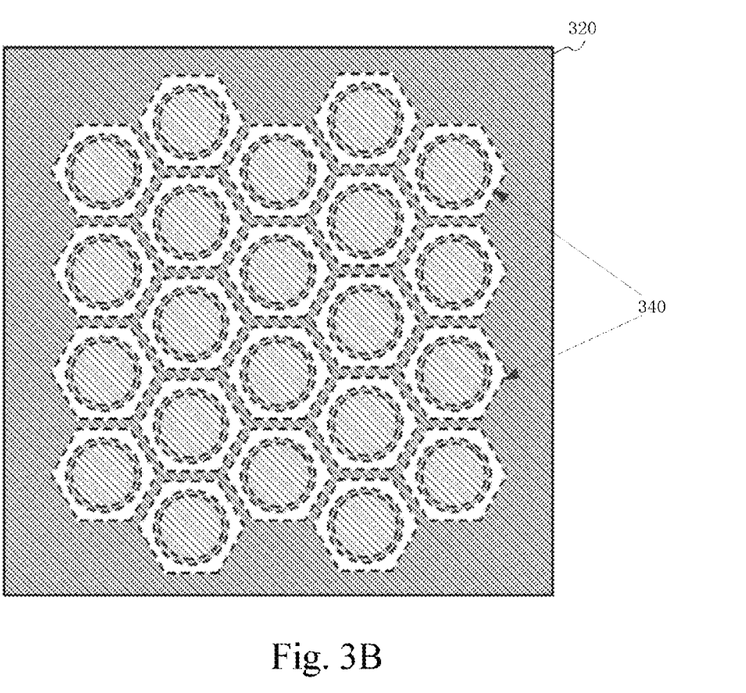
FIG. 3B is a tessellation schematic diagram of a physical feedback unit provided by the second embodiment of the present disclosure.

The number of the physical feedback unit 340 may be two or more. The physical feedback unit 340 is tessellated below the entire or a partial region of the flexible touch screen 320, as shown in FIG. 3B. The so-called "tessellation" refers to placing of different graphs without overlapping or missing to fully pave an interior of a plane without gaps or overlapping. At this time, the projection shape of each physical feedback unit 340 on the plane of the flexible touch screen 320 is a polygon. The polygon may not only include a square and/or a regular hexagon, but also include a rectangle, a regular triangle, and the like. In the embodiment, the projection shape of each physical feedback unit 340 on the plane of the flexible touch screen 320 being a regular hexagon is exemplified only.

Each physical feedback unit 340 includes an armature part and a coil part, at least one of the armature part and the coil part is in an active state, and a relative distance between the armature part and the coil part is initially a predetermined value. When the coil part is energized with a current, the relative distance between the armature part and the coil part is changed due to electromagnetism, the changed relative distance is greater than or less than a predetermined value, so that a protrusion or a depression is formed at the corresponding position of the flexible touch screen 320.

According to different structures and positions of the armature part and the coil part, the physical feedback unit 340 may have different implementation manners. For example, each physical feedback unit 340 may be any one of the four physical feedback units as follows.

Figure 3C:
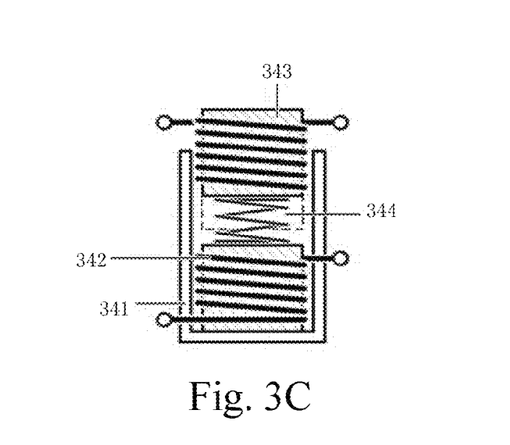
FIGS. 3C to 3F are four structural schematic diagrams of a first type physical feedback unit provided by the second embodiment of the present disclosure.
Figure 3D:
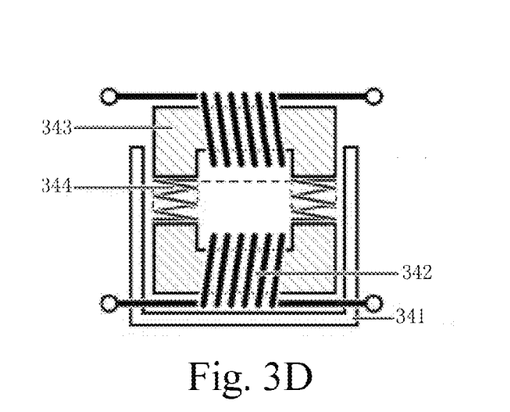
Figure 3E:
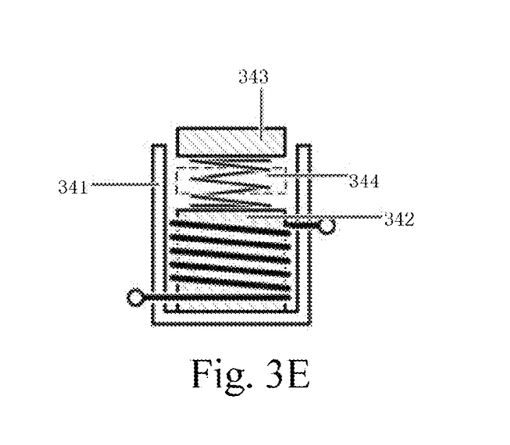
Figure 3F:
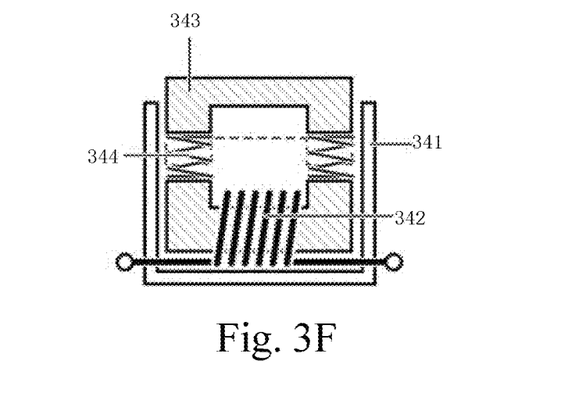

A first type physical feedback unit 340a includes a housing 341, a coil part 342 within a lower portion of the housing 341 and in a stationary state, and an armature part 343 within an upper portion of the housing 341 and in an active state, the armature part 343 is an electromagnet or a permanent magnet, and the armature part 343 is connected with the coil part 342 through a spring 344. The structural schematic diagram of the armature part 343 being an electromagnet may be as shown in FIG. 3C or FIG. 3D; and the structural schematic diagram of the armature part 343 being a permanent magnet may be as shown in FIG. 3E or FIG. 3F. The physical feedback unit as shown in FIGS. 2A to 2C is namely the first type physical feedback unit. In some embodiments, the coil part 342 and the armature part 343 in the first type physical feedback unit 340a are respectively independent magnets, wherein the coil part 342 fastens the electromagnet that comprises an iron core, which can better generate magnetic force thereby shortening the corresponding time.

Figure 3G:
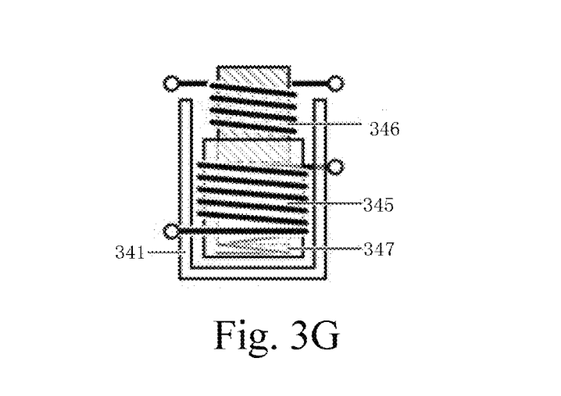
FIGS. 3G and 3H are two structural schematic diagrams of a second type physical feedback unit provided by the second embodiment of the present disclosure.
Figure 3H:
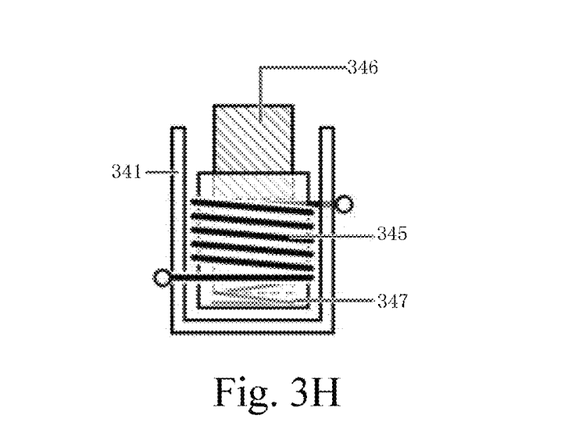

A second type physical feedback unit 340b includes a housing 341, a tubular coil part 345 within a lower portion of the housing 341 and in a stationary state, and a cylindrical armature part 346 within a cavity of the tubular coil part 345 and in an active state, the cylindrical armature part 346 is an electromagnet or a permanent magnet, and a lower portion of the cylindrical armature part 346 is connected with the housing 341 through a spring 347. The structural schematic diagram of the cylindrical armature part 346 being an electromagnet may be as shown in FIG. 3G; and the structural schematic diagram of the cylindrical armature part 346 being a permanent magnet may be as shown in FIG. 3H. The physical feedback unit as shown in FIG. 3A is namely the second type physical feedback unit. In some embodiments, the second type physical feedback unit 340b comprises the tubular coil part 345 and the cylindrical armature part 346, which is a quite simple structure with few mechanical failures.

A third type physical feedback unit includes a housing, an armature part within a lower portion of the housing and in a stationary state, and a coil part within an upper portion of the housing and in an active state, the armature part is a permanent magnet, and the armature part is connected with the coil part through a spring. Since the structures of the third type physical feedback unit and the first type physical feedback unit are substantially symmetric, the structural schematic diagram of the third type physical feedback unit may be obtained by exchanging the positions of the armature part 343 and the coil part 342 in FIG. 3E or FIG. 3F.

A fourth type physical feedback unit includes a housing, a tubular armature part within a lower portion of the housing and in a stationary state, and a cylindrical coil part within a cavity of the tubular armature part and in an active state, the tubular armature part is a permanent magnet, and a lower portion of the cylindrical coil part is connected with the housing through a spring. Since the structures of the fourth type physical feedback unit and the second type physical feedback unit are substantially symmetric, the block diagram of the fourth type physical feedback unit may be obtained by exchanging the positions of the tubular coil part 345 and the cylindrical armature part 346 in FIG. 3H.

It should be noted that, in the foregoing examples, it is only illustrated that one of the armature part and the coil part is in an active state and the other is in a stationary state. But in a specific embodiment, there may possibly be an implementation manner that both the armature part and the coil part are in an active state; for instance, the armature part and the coil part are connected through a spring, and one of the armature part and the coil part within the lower portion of the housing is also connected with the housing through a spring.

Moreover, it can be known with reference to the above structural schematic diagrams, the relative distance between the armature part and the coil part is initially a predetermined value, so that the flexible touch screen 320 keeps flat. When the coil part is energized with a positive current, the relative distance between the armature part and the coil part is changed to a first value due to electromagnetism, and the first value is greater than the predetermined value, so that a protrusion is formed at the corresponding position of the flexible touch screen 320. When the coil part is energized with a negative current, the relative distance between the armature part and the coil part is changed to a second value due to electromagnetism, and the second value is less than the predetermined value, so that a depression is formed at the corresponding position of the flexible touch screen 320. Since the relative motion between the armature part and the coil part due to electromagnetism is very fast, the speed for generating a physical deformation on the flexible touch screen 320 is also very fast.

In conclusion, the physical feedback system provided by the embodiment implements the physical feedback of the flexible touch screen through the physical feedback unit including the armature part and the coil part, solves the problem of long response time for implementing the physical feedback system by using an electrified liquid medium, and achieves the effect of enabling the flexible touch screen to be physically deformed quickly so as to greatly shorten the response time by energizing the coil part only.

Third Embodiment

Figure 4A:
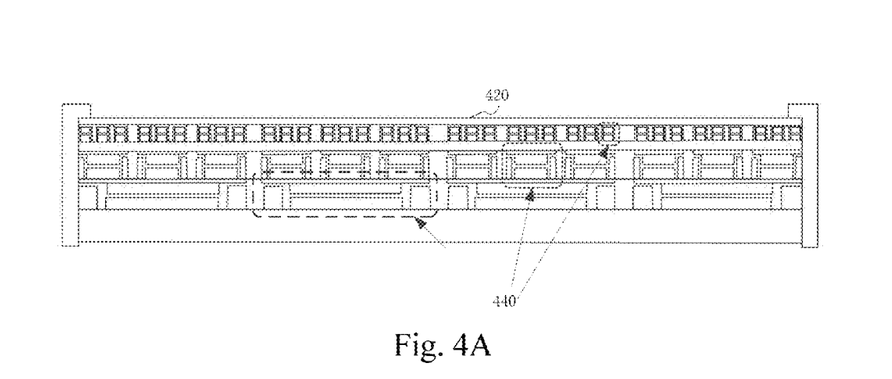
FIG. 4A is a structural schematic diagram of a physical feedback system provided by a third embodiment of the present disclosure.

Referring to FIG. 4A, which illustrates a structural schematic diagram of a physical feedback system provided by the third embodiment of the present disclosure, the physical feedback system may be implemented to become a part of an electronic device including a flexible touch screen. The electronic device may be any one of a smartphone, a tablet, an e-book reader, a laptop computer or a desktop display.

The physical feedback system includes: at least one physical feedback unit 440 below a flexible touch screen 420.

The flexible touch screen 420 may be a rectangular flexible touch screen. The physical feedback unit 440 may be disposed below the entire region or a partial region of the flexible touch screen 420. In the embodiment, disposing the physical feedback unit 420 below the entire region of the flexible touch screen 440 is exemplified only.

Figure 4B:
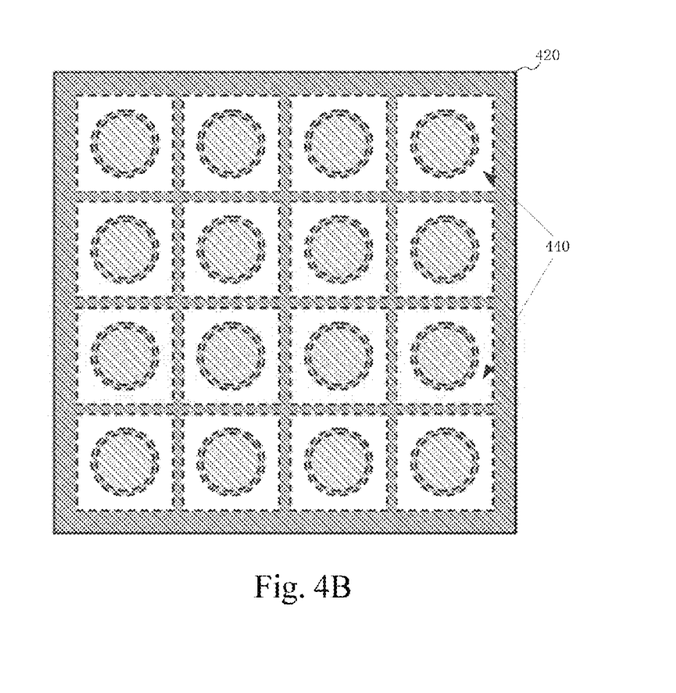
FIG. 4B is a tessellation schematic diagram of a physical feedback unit provided by the third embodiment of the present disclosure.

As an embodiment more preferable than that provided by the second embodiment, in the present embodiment, the number of the physical feedback unit 440 is two or more. The physical feedback units 440 are tessellated on multilayered planes adjacent from top to bottom below the entire (or partial region) of the flexible touch screen 420. The projection shape of each physical feedback unit 440 on the plane of the flexible touch screen 420 is a polygon, and the projection shape of the physical feedback unit 440 located in the lower layer on the plane of the flexible touch screen 420 is greater than or equal to the projection shape of the physical feedback unit 440 located in the upper layer on the plane of the flexible touch screen 420. In the embodiment, the projection shape of each physical feedback unit 440 on the plane of the flexible touch screen 420 being a square is exemplified only, as shown in FIG. 4B.

For example, three layers of physical feedback units 440 are disposed below the flexible touch screen 420, wherein a side length of the square of the physical feedback unit 440 in the undermost layer is 9a; the side length of the square of the physical feedback unit 440 in the middle layer is 3a; and the side length of the square of the physical feedback unit 440 in the upmost layer is a. That is, there are nine physical feedback units 440 in the middle layer disposed above one physical feedback unit 440 in the undermost layer; and there are nine physical feedback units 440 in the upmost layer disposed above one physical feedback unit 440 in the middle layer.

In this case, through energizing the physical feedback units 440 in different layers, the deformation size of the flexible touch screen 420 in a longitudinal direction is larger, for instance, given that the deformation size of the physical feedback unit in the second embodiment in the longitudinal direction is h, and the deformation size of the physical feedback unit in each layer in the third embodiment in the longitudinal direction is also h, then the deformation size of the flexible touch screen 420 in the third embodiment in the longitudinal direction will be 3 h, and the response time is still identical to that needed by the physical feedback unit provided by the second embodiment. The minimum deformation size of the flexible touch screen 420 on the plane thereof is determined by the projection shape of the physical feedback unit 440 in the upmost layer on the plane of the flexible touch screen 420. Meanwhile, through energizing the physical feedback units 440 in different layers, combining with the fact that the projection shape of the physical feedback unit 440 of the lower layer on the plane of the flexible touch screen 420 is larger than or the same as the one of the upper layer, more complicated shapes of slopes and effects of the surface texture can be formed on the surface of the screen. In some embodiments, terrains and architectures with different heights can be formed.

In conclusion, the physical feedback system provided by the embodiment implements the physical feedback of the flexible touch screen through the physical feedback unit including the armature part and the coil part, solves the problem of long response time for implementing the physical feedback system by using an electrified liquid medium, and achieves the effect of enabling the flexible touch screen to be physically deformed quickly so as to greatly shorten the response time by energizing the coil part only. Meanwhile, through disposing multilayered physical feedback units below the flexible touch screen, the deformation size of the flexible touch screen in the longitudinal direction become large without changing the response time, so that the present disclosure is more suitably implemented on an electronic device including a large flexible touch screen, for example, a screen for broadcasting weather forecast, and a computer in a graphic workstation. Moreover, since the physical feedback unit achieves the physical feedback and recognizes inputted signals depending on an electromagnetic piezoelectric effect, there is no contact or junction point provided in the interior of the physical feedback unit, thus reducing losses caused by friction, and increasing the input accuracy and service life.

Fourth Embodiment

Figure 5:
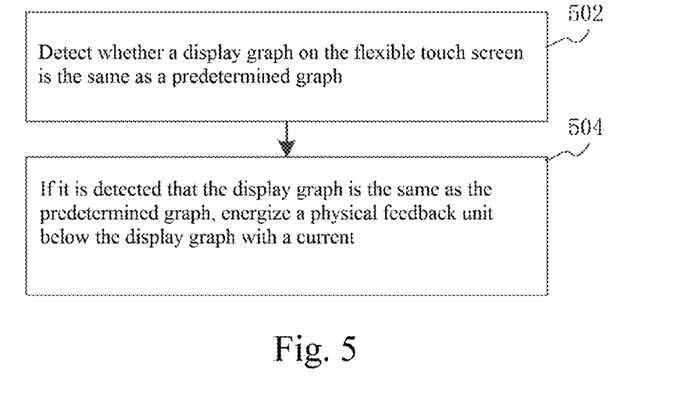
FIG. 5 is a flow chart of a control method for a physical feedback system provided by a fourth embodiment of the present disclosure.

Referring to FIG. 5, which illustrates a flow chart of a control method for a physical feedback system provided by the fourth embodiment of the present disclosure, the control method for a physical feedback system may be applied to an electronic device including a flexible touch screen and the physical feedback system provided by the first embodiment or the second embodiment. The control method for a physical feedback system includes the following steps.

In step 502, whether a display graph on the flexible touch screen is the same as a predetermined graph is detected, the predetermined graph including any one or a combination of a button, a frame, a tag, a menu, a hyperlink and an icon.

In step 504, if it is detected that the display graph is the same as the predetermined graph, a physical feedback unit below the display graph is energized with a current, so that a relative distance between an armature part and a coil part in the physical feedback unit is changed due to electromagnetism.

If the detection result of the electronic device is that the display graph is the same as the predetermined graph, then the electronic device energizes the physical feedback unit below the display graph, so that the relative distance between the armature part and the coil part in the physical feedback unit is changed due to electromagnetism; in this way, a protrusion or a depression is formed at the display graph on the flexible touch screen.

In conclusion, the control method for a physical feedback system provided by the embodiment implements the physical feedback of the flexible touch screen through energizing the physical feedback unit below the display graph on the flexible touch screen when the display graph is the same as the predetermined graph, solves the problem of long response time for implementing the physical feedback system by using an electrified liquid medium, and achieves the effect of enabling the flexible touch screen to be physically deformed quickly so as to greatly shorten the response time by energizing the coil part only.

Fifth Embodiment

Figure 6:
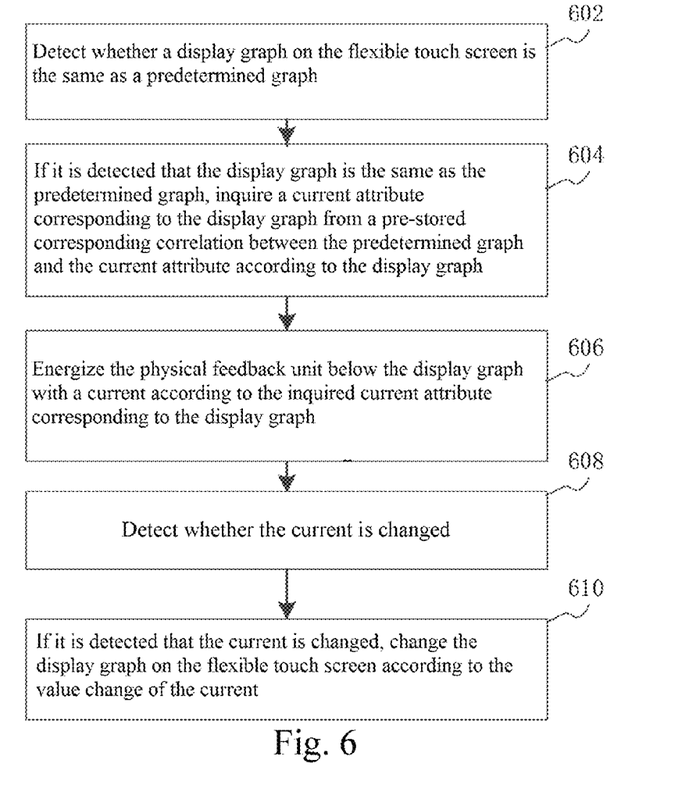
FIG. 6 is a flow chart of a control method for a physical feedback system provided by a fifth embodiment of the present disclosure.

Referring to FIG. 6, which illustrates a flow chart of a control method for a physical feedback system provided by the fifth embodiment of the present disclosure, the control method for a physical feedback system may be applied to an electronic device including a flexible touch screen and the physical feedback system provided by the first embodiment or the second embodiment. The control method for a physical feedback system includes the following steps.

In step 602, whether a display graph on the flexible touch screen is the same as a predetermined graph is detected, the predetermined graph including any one or a combination of a button, a frame, a tag, a menu, a hyperlink and an icon.

Supposing an initial state of the flexible touch screen is a flat state, an electronic device detects whether a display graph on the flexible touch screen is the same as a predetermined graph, the predetermined graph including any one or a combination of a button, a frame, a tag, a menu, a hyperlink and an icon.

In step 604, if it is detected that the display graph is the same as the predetermined graph, then a current attribute corresponding to the display graph is inquired from a pre-stored corresponding correlation between the predetermined graph and the current attribute according to the display graph, the current attribute including a current direction and a current value.

The electronic device may pre-store the corresponding correlation between the predetermined graph and the current attribute, for instance, a corresponding correlation between the predetermined graph (button) and the current attribute (positive, current value x mA", and a corresponding correlation between the predetermined graph (frame) and the current attribute (positive, current value ya mA, grey level a of the frame). When the detection result of the electronic device is that the display graph is the same as the predetermined graph, then the electronic device may inquire the current attribute corresponding to the display graph from the pre-stored corresponding correlation between the predetermined graph and the current attribute according to the display graph, the current attribute including a current direction and a current value.

In step 606, the physical feedback unit below the display graph is energized with a current according to the inquired current attribute corresponding to the display graph, so that a relative distance between an armature part and a coil part in the physical feedback unit is changed due to electromagnetism.

The electronic device energizes the physical feedback unit below the display graph according to the inquired current attribute corresponding to the display graph, so that the relative distance between the armature part and the coil part in the physical feedback unit is changed due to electromagnetism; in this way, a protrusion or a depression is formed at the display graph on the flexible touch screen. At this time, the change of the relative distance H depends on the current intensity in the physical feedback unit.

In step 608, whether the current is changed is detected.

There is a big difference between the operating mode of the flexible touch screen including a physical feedback system and that of an ordinary touch screen, for instance, when a user touches one button on the ordinary touch screen, an operation that the electronic device deems the button is pressed will be triggered. However, when the user touches one button on the flexible touch screen including a physical feedback system, only the operation that the electronic device makes the cursor staying on the button and makes the button to become a highlighted state for feedback will be triggered; and only when the user performs an actual physical pressing on the button, the operation that the electronic device deems the button is pressed would be triggered. At this time, the electronic device not only needs to collect the position of the fingers of the user on the touch screen through the flexible touch screen, but also needs to collect the pressing operation of the fingers of the user on the touch screen through the physical feedback unit. When the user performs the pressing operation on the physical feedback unit through the fingers, the current in the physical feedback unit will be changed due to the reverse current reaction. The electronic device may detect whether the current inputted in the physical feedback unit is changed, so as to judge whether the user is pressing on the physical feedback unit through the fingers, and acquire such information as a displacement, a strength, a speed of pressing of the fingers of the user through the value change of the current. In some embodiments, when users press with their fingers, the coil part of the physical feedback unit 340 generates a magnetic field when energized with constant electric current. The press from users' fingers enables the armature of the physical feedback unit 340 to cut the magnetic field lines, thereby generating the electric current in the coil part. Moreover, the speed and the displacement of the press from the users' fingers will lead to the change in the magnitude of the electric current, and the change in the electric current superimposes upon the constant current and forms superimposed current. In this case, the speed and the displacement of the press from the users' fingers can be acquired by testing the change of the superimposed electric current, while the strength of the finger press can be acquired from the speed and the displacement. In some other embodiments, when acquiring the strength of the finger press, the feedback force fed back to the users will be increased or reduced by adjusting the magnitude of the constant electric current imposed on the coil part of the physical feedback unit 340, thereby achieving the effect of simulating the force feedback of the mechanical keyboard.

In step 610, if it is detected that the current is changed, then the display graph on the flexible touch screen is changed according to the value change of the current. In some embodiments, the current can be adjusted according to the value change of the current. In other embodiments, both the current and the display graph on the flexible touch screen can be adjusted according to the value change of the current.

If the detection result of the electronic device is that the current inputted in the physical feedback unit is changed, then different operations are triggered according to different scenes.

In such a scene as that the display contents of the flexible display screen need to be changed after the button on the display graph is pressed, if the detection result of the electronic device is that the current inputted in the physical feedback unit is changed, then the display graph on the flexible touch screen is changed according to the value change of the current.

In such a scene as providing the user with a hand feeling approximate to a real physical key after the button on the display graph is pressed, if the detection result of the electronic device is that the current inputted in the physical feedback unit is changed, then the current is re-adjusted according to the value change of the current. In one embodiment, the adjusting the current according to the value change of the current includes the two sub-steps as follows.

In first sub-step, a current attribute corresponding to a value change of the current is inquired from a pre-stored corresponding correlation between the value change and the current attribute according to the value change, the current attribute including a current direction and a current value.

Figure 7:
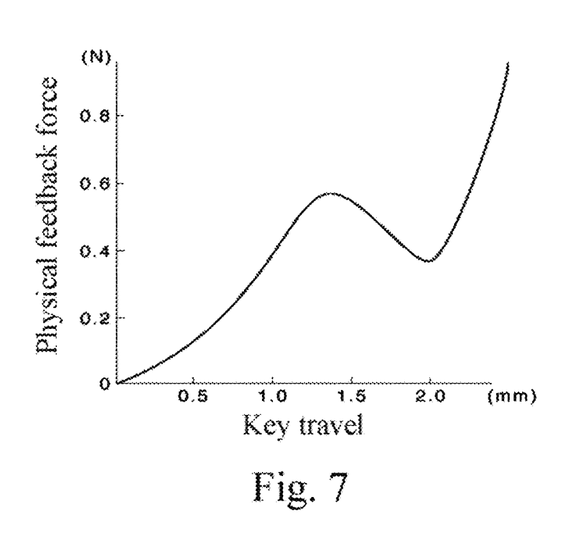
FIG. 7 is a correlation diagram of a key travel and a physical feedback force of an actual physical key involved in the fifth embodiment of the present disclosure.

The electronic device may pre-store the corresponding correlation between the value change of the current and the current attribute needing adjustment, for example, a correlation diagram of a key travel and a physical feedback force of an actual physical key may be as shown in FIG. 7. In order to simulate the physical key, the corresponding correlation between the value change of the current and the current attribute needing adjustment may be calculated according to the correlation as shown in FIG. 7. In particular, the value change of the current is proportional to the pressing displacement of the fingers of the user. After a proportional corresponding correlation is established for the value change of the current and the key travel of the physical key, a corresponding physical feedback force may be inquired according to the correlation as shown in FIG. 7, and then the current attribute needing adjustment may be calculated according to the inquired physical feedback force, thus establishing the corresponding correlation between the value change of the current and the current attribute needing adjustment. The electronic device may pre-store the corresponding correlation between the value change of the current and the current attribute needing adjustment, and after one value change of the current is detected, inquire a current attribute corresponding to the value change from the pre-stored corresponding correlation between the value change and the current attribute according to the detected value change of the current, the current attribute including a current direction and a current value.

In second sub-step, the current is adjusted according to the inquired current attribute corresponding to the value change of the current.

Afterwards, the electronic device adjusts the current according to the inquired current attribute corresponding to the value change of the current, so that the user obtains a more real physical feedback feeling when pressing the protrusion button formed by the physical feedback unit on the flexible touch screen.

In conclusion, the control method for a physical feedback system provided by the embodiment implements the physical feedback of the flexible touch screen through energizing the physical feedback unit below the display graph on the flexible touch screen when the display graph is the same as the predetermined graph, solves the problem of long response time for implementing the physical feedback system by using an electrified liquid medium, and achieves the effect of enabling the flexible touch screen to be physically deformed quickly so as to greatly shorten the response time by energizing the coil part only. Moreover, through further adjusting the display graph of the flexible display screen or re-adjusting the current in the physical feedback unit by the value change of the current in the physical feedback unit, the method enables the user to obtain a more real physical feedback feeling during the operation process, makes the operation process more real and effective, and effectively avoids misoperations.

Sixth Embodiment

Figure 8:
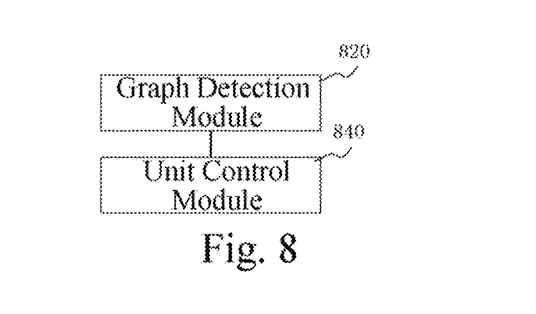
FIG. 8 is a block diagram of an apparatus for controlling a physical feedback system provided by a sixth embodiment of the present disclosure.

Referring to FIG. 8, which illustrates a block diagram of an apparatus for controlling a physical feedback system provided by the sixth embodiment of the present disclosure. The apparatus for controlling a physical feedback system may be applied to an electronic device including a flexible touch screen and the physical feedback system provided by the first embodiment or the second embodiment. The apparatus for controlling a physical feedback system includes: a graph detection module 820 and a unit control module 840.

The graph detection module 820 is configured to detect whether a display graph on the flexible touch screen is the same as a predetermined graph, the predetermined graph including any one or a combination of a button, a frame, a tag, a menu, a hyperlink and an icon.

The unit control module 840 is configured to, if the detection result of the graph detection module 820 is that the display graph is the same as the predetermined graph, energize a physical feedback unit below the display graph with a current, so that a relative distance between an armature part and a coil part in the physical feedback unit is changed due to electromagnetism.

In conclusion, the apparatus for controlling a physical feedback system provided by the embodiment implements the physical feedback of the flexible touch screen through energizing the physical feedback unit below the display graph on the flexible touch screen when the display graph is the same as the predetermined graph, solves the problem of long response time for implementing the physical feedback system by using an electrified liquid medium, and achieves the effect of enabling the flexible touch screen to be physically deformed quickly so as to greatly shorten the response time by energizing the coil part only.

Sixth Embodiment

Figure 9:
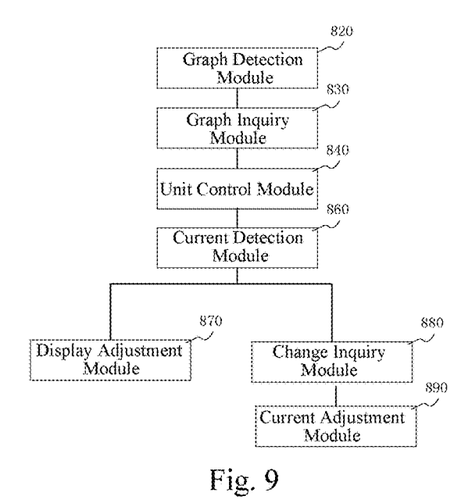
FIG. 9 is a block diagram of an apparatus for controlling a physical feedback system provided by the sixth embodiment of the present disclosure.

Referring to FIG. 9, which illustrates a block diagram of an apparatus for controlling a physical feedback system provided by the sixth embodiment of the present disclosure, the apparatus for a physical feedback system may be applied to an electronic device including a flexible touch screen and the physical feedback system provided by the first embodiment or the second embodiment. The apparatus for controlling a physical feedback system includes: a graph detection module 820, a graph inquiry module 830, a unit control module 840, a current detection module 860, a display adjustment module 870 and a current adjustment module 890.

The graph detection module 820 is configured to detect whether a display graph on the flexible touch screen is the same as a predetermined graph, the predetermined graph including any one or a combination of a button, a frame, a tag, a menu, a hyperlink and an icon.

The graph inquiry module 830 is configured to inquire a current attribute corresponding to the display graph from a pre-stored corresponding correlation between the predetermined graph and the current attribute according to the display graph detected by the graph detection module 820, the current attribute including a current direction and a current value.

The unit control module 840 is configured to energize the physical feedback unit below the display graph with a current according to the current attribute corresponding to the display graph inquired by the graph inquiry module 840.

The current detection module 860 is configured to detect whether a current outputted by the unit control module 840 is changed.

The display adjustment module 870 is configured to, if the detection result of the current detection module 860 is that the current is changed, change the display graph on the flexible touch screen according to the value change of the current.

The current adjustment module 890 is configured to, if the detection result of the current detection module 860 is that the current is changed, adjust the current according to the value change of the current.

In one more embodiment, the apparatus further includes: a change inquiry module 880.

The change inquiry module 880 is configured to inquire a current attribute corresponding to the value change from a pre-stored corresponding correlation between the value change and the current attribute according to the value change of the current detected by the current detection module 860, the current attribute including a current direction and a current value.

The current adjustment module 890 is configured to adjust the current according to the current attribute corresponding to the value change of the current inquired by the change inquiry module 880.

It should be illustrated that, in some embodiments, the apparatus may not include the change inquiry module 880 and the current adjustment module 890. In some other embodiments, the apparatus may not include the display adjustment module 870.

In conclusion, the apparatus for controlling a physical feedback system provided by the embodiment implements the physical feedback of the flexible touch screen through energizing the physical feedback unit below the display graph on the flexible touch screen when the display graph is the same as the predetermined graph, solves the problem of long response time for implementing the physical feedback system by using an electrified liquid medium, and achieves the effect of enabling the flexible touch screen to be physically deformed quickly so as to greatly shorten the response time by energizing the coil part only. Moreover, through further adjusting the display graph of the flexible display screen or re-adjusting the current in the physical feedback unit by the value change of the current in the physical feedback unit, the method enables the user to obtain a more real physical feedback feeling during the operation process, makes the operation process more real and effective, and effectively avoids misoperations.

Seventh Embodiment

Figure 10:
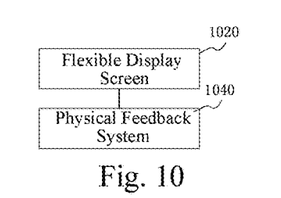
FIG. 10 is a block diagram of a display assembly provided by a seventh embodiment of the present disclosure.

Referring to FIG. 10, which illustrates a block diagram of a display assembly provided by the seventh embodiment of the present disclosure, the display assembly includes a flexible display screen 1020 and a physical feedback system 1040.

The physical feedback system 1040 may be any one of the physical feedback system provided by the first embodiment to the third embodiment.

In conclusion, the display assembly provided by the embodiment is provided with the physical feedback unit including the armature part and the coil part below the flexible touch screen, thus solves the problem of long response time for implementing the physical feedback system by using an electrified liquid medium, and achieves the effect of enabling the flexible touch screen to be physically deformed quickly so as to greatly shorten the response time by energizing the coil part only.

Eighth Embodiment

Figure 11:
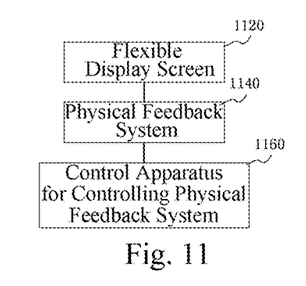
FIG. 11 is a block diagram of an electronic device provided by an eighth embodiment of the present disclosure.

Referring to FIG. 11, which illustrates a block diagram of an electronic device provided by the seventh embodiment of the present disclosure, the electronic device includes a flexible display screen 1120, a physical feedback system 1140 and a control apparatus 1160 for controlling a physical feedback system. The electronic device may include a processor and a memory for storing instructions executable by the processor (not shown in the drawings). Herein the processor is configured to: detect whether a display graph on the flexible touch screen is the same as a predetermined graph, the predetermined graph comprising any one or a combination of a button, a frame, a tag, a menu, a hyperlink and an icon; and if it is detected that the display graph is the same as the predetermined graph, energize a physical feedback unit below the display graph with a current, so that a relative distance between the armature part and the coil part in the physical feedback unit is changed due to electromagnetism.

The physical feedback system 1140 may be any one of the physical feedback system provided by the first embodiment to the third embodiment.

The control apparatus 1160 for controlling a physical feedback system may be the apparatus provided by the fifth embodiment or the sixth embodiment.

In conclusion, the electronic device provided by the embodiment is provided with the physical feedback system including the armature part and the coil part below the flexible touch screen, thus solves the problem of long response time for implementing the physical feedback system by using an electrified liquid medium, and achieves the effect of enabling the flexible touch screen to be physically deformed quickly so as to greatly shorten the response time by energizing the coil part only.

It should be illustrated that: when the control apparatuses for controlling a physical feedback system provided in the above embodiments are controlling the physical feedback system, it is only illustrated by taking the division of each functional module as an example. During practical application, the foregoing function distribution may be completed by different functional modules according to requirements. That is, the interior of the device is divided into different functional modules so as to complete all or part of the functions described above. Moreover, the control apparatuses for controlling a physical feedback system provided by the foregoing embodiments and the embodiments of the control method for a physical feedback system belong to the same conception, and the detailed implementation process thereof is as shown in the embodiments of the method, which will not be elaborated herein.

The numbers of the foregoing embodiments of the present invention are for description only, and do not represent superior or inferior of the embodiments.

It may be understood by the person skilled in the art that the all or part steps of implementing the foregoing embodiments may be completed through hardware or may be completed through relevant hardware instructed by a program. The program may be stored in a computer readable storage medium, and the storage medium mentioned above may be a read-only memory (ROM), a magnetic tape, or an optical disk, and the like.

The foregoing is merely preferred embodiments of the invention, but is not intended to limit the invention; and any modification, equivalent replacement, improvement and the like made within the spirits and principles of the invention shall all fall within the protection scope of the invention.

What is claimed is:

1. A physical feedback system, comprising:
   two or more physical feedback units below a flexible touch screen;
   wherein the two or more physical feedback units are tessellated on multilayered planes adjacent from top to bottom below an entire or partial region of the flexible touch screen, a projection shape of each physical feedback unit on a plane of the flexible touch screen is a polygon, and the projection shape of the physical feedback unit located in a lower layer on the plane of the flexible touch screen is greater than or equal to the projection shape of the physical feedback unit located in an upper layer on the plane of the flexible touch screen;

wherein each of the two or more physical feedback units comprises an armature part and a coil part, at least one of the armature part and the coil part is in an active state, and a relative distance between the armature part and the coil part is initially a predetermined value; and when the coil part is energized with a current, the relative distance between the armature part and the coil part is changed due to electromagnetism, and the changed relative distance is greater than or less than a predetermined value, so that a protrusion or a depression is formed at a corresponding position of the flexible touch screen.

2. The physical feedback system according to claim 1, wherein when the coil part is energized with a positive current, the relative distance between the armature part and the coil part is changed to a first value due to electromagnetism, and the first value is greater than the predetermined value, so that the protrusion is formed at the corresponding position of the flexible touch screen; and when the coil part is energized with a negative current, the relative distance between the armature part and the coil part is changed to a second value due to electromagnetism, and the second value is less than the predetermined value, so that the depression is formed at the corresponding position of the flexible touch screen.

3. The physical feedback system according to claim 2, wherein the polygon comprises a square and/or a regular hexagon.

4. The physical feedback system according to claim 1, wherein the polygon comprises a square and/or a regular hexagon.

5. The physical feedback system according to claim 4, wherein one or more of the two or more physical feedback units is any one of four physical feedback units as follows:

a first type physical feedback unit comprising a housing, a coil part within a lower portion of the housing and in a stationary state, and an armature part within an upper portion of the housing and in an active state, the armature part being an electromagnet or a permanent magnet, and the armature part being connected with the coil part through a spring;

a second type physical feedback unit comprising a housing, a tubular coil part in a lower portion of the housing and in a stationary state, and a cylindrical armature part in a cavity of the tubular coil part and in an active state, the cylindrical armature part being an electromagnet or a permanent magnet, and a lower portion of the cylindrical armature part being connected with the housing through a spring;

a third type physical feedback unit comprising a housing, an armature part in a lower portion of the housing and in a stationary state, and a coil part in an upper portion of the housing and in an active state, the armature part being a permanent magnet, and the armature part being connected with the coil part through a spring; and a fourth type physical feedback unit comprising a housing, a tubular armature part in a lower portion of the housing and in a stationary state, and a cylindrical coil part in a cavity of the tubular armature part and in an active state, the tubular armature part being a permanent magnet, and a lower portion of the cylindrical coil part being connected with the housing through a spring.

6. A method for controlling a physical feedback system in an electronic device comprising a flexible display screen and the physical feedback system according to claim 1, the method comprising:

detecting whether a display graph on the flexible touch screen is the same as a predetermined graph, the predetermined graph comprising any one or a combination of a button, a frame, a tag, a menu, a hyperlink and an icon; and if it is detected that the display graph is the same as the predetermined graph, energizing a physical feedback unit below the display graph with a current, so that a relative distance between the armature part and the coil part in the physical feedback unit is changed due to electromagnetism.

7. The method according to claim 6, wherein before energizing the physical feedback unit below the display graph, the method further comprises:

inquiring a current attribute corresponding to the display graph from a pre-stored corresponding correlation between the predetermined graph and the current attribute according to the display graph, the current attribute comprising a current direction and a current value; and wherein energizing the physical feedback unit below the display graph comprises:

energizing the physical feedback unit below the display graph according to the inquired current attribute corresponding to the display graph.

8. The method according to claim 7, wherein after energizing the physical feedback unit below the display graph, the method further comprises:

detecting whether the current is changed; and if it is detected that the current is changed, changing the display graph on the flexible touch screen according to a value change of the current.

9. The method according to claim 7, wherein after energizing the physical feedback unit below the display graph, the method further comprises:

detecting whether the current is changed; and if it is detected that the current is changed, adjusting the current according to a value change of the current.

10. The method according to claim 6, wherein after energizing the physical feedback unit below the display graph, the method further comprises:

detecting whether the current is changed; and if it is detected that the current is changed, changing the display graph on the flexible touch screen according to a value change of the current.

11. The method according to claim 6, wherein after energizing the physical feedback unit below the display graph, the method further comprises:

detecting whether the current is changed; and if it is detected that the current is changed, adjusting the current according to a value change of the current.

12. The method according to claim 11, wherein before adjusting the current according to the value change of the current, the method further comprises:

inquiring a current attribute corresponding to the value change of the current from a pre-stored corresponding correlation between the value change and the current attribute according to the value change, the current attribute comprising the current direction and the current value; and adjusting the current according to the value change of the current comprises:

adjusting the current according to the inquired current attribute corresponding to the value change of the current.

13. An electronic device for controlling a physical feedback system according to claim 1, comprising:

a processor;

a flexible display screen; and a memory for storing instructions executable by the processor, wherein the processor is configured to:

detect whether a display graph on the flexible touch screen is the same as a predetermined graph, the predetermined graph comprising any one or a combination of a button, a frame, a tag, a menu, a hyperlink and an icon; and if it is detected that the display graph is the same as the predetermined graph, energize a physical feedback unit below the display graph with a current, so that a relative distance between the armature part and the coil part in the physical feedback unit is changed due to electromagnetism.

14. The electronic device according to claim 13, wherein the processor is further configured to:

inquire a current attribute corresponding to the detected display graph from a pre-stored corresponding correlation between the predetermined graph and the current attribute according to the display graph, the current attribute comprising a current direction and a current value; and energize the physical feedback unit below the display graph according to the inquired current attribute corresponding to the display graph.

15. The electronic device according to claim 14, wherein the processor is configured to:

detect whether the current is changed; and if it is detected that the current is changed, change the display graph on the flexible touch screen according to a value change of the current.

16. The electronic device according to claim 14, wherein the processor is configured to:

detect whether the current is changed; and if it is detected that the current is changed, adjust the current according to a value change of the current.

17. The electronic device according to claim 13, wherein the processor is configured to:

detect whether the current is changed; and if it is detected that the current is changed, change the display graph on the flexible touch screen according to a value change of the current.

18. The electronic device according to claim 13, wherein the processor is configured to:

detect whether the current is changed; and if it is detected that the current is changed, adjust the current according to a value change of the current.

19. The electronic device according to claim 18, wherein the processor is configured to:

inquire a current attribute corresponding to the value change of the current from a pre-stored corresponding correlation between the value change and the current attribute according to the value change, the current attribute comprising a current direction and a current value; and adjust the current according to the inquired current attribute corresponding to the value change of the current.

* * * * *